United States Patent
Hubert et al.

(10) Patent No.: US 7,740,172 B1
(45) Date of Patent: Jun. 22, 2010

(54) METHODS AND SYSTEMS FOR MANAGING PRICE AND INVENTORY ADJUSTMENTS

(75) Inventors: Zachary T. Hubert, Seattle, WA (US); Sudarshan N. Raghavan, Newcastle, WA (US); Pradeep Kancharia, Bellevue, WA (US); Leon I. Sverntlof, Kirkland, WA (US)

(73) Assignee: Amazon Technologies, Inc., Reno, NV (US)

(*) Notice: Subject to any disclaimer, the term of this patent is extended or adjusted under 35 U.S.C. 154(b) by 830 days.

(21) Appl. No.: 11/564,044

(22) Filed: Nov. 28, 2006

(51) Int. Cl.
*G06K 15/00* (2006.01)
*G06F 19/00* (2006.01)

(52) U.S. Cl. ...................... 235/383; 235/385
(58) Field of Classification Search ............. 235/383, 235/385, 492, 380, 382, 375
See application file for complete search history.

(56) References Cited

U.S. PATENT DOCUMENTS

| | | | | |
|---|---|---|---|---|
| 5,933,813 | A * | 8/1999 | Teicher et al. | 705/26 |
| 2001/0032163 | A1 * | 10/2001 | Fertik et al. | 705/37 |
| 2003/0046218 | A1 * | 3/2003 | Albanese et al. | 705/37 |
| 2005/0197971 | A1 * | 9/2005 | Kettner et al. | 705/400 |
| 2005/0273376 | A1 * | 12/2005 | Ouimet et al. | 705/10 |
| 2006/0053024 | A1 * | 3/2006 | Chen et al. | 705/1 |
| 2006/0195345 | A1 * | 8/2006 | Close et al. | 705/7 |
| 2006/0253334 | A1 * | 11/2006 | Fukasawa | 705/26 |
| 2008/0201273 | A1 * | 8/2008 | Davis et al. | 705/400 |
| 2008/0243668 | A1 * | 10/2008 | Ondyak et al. | 705/37 |

* cited by examiner

*Primary Examiner*—Thien M Le
(74) *Attorney, Agent, or Firm*—Thomas, Kayden, Horstemeyer & Risley, LLP

(57) ABSTRACT

Systems and methods for automating the price adjustments for items in a network-based environment are described in this application. The price adjustment can consider both the price information and non-price information of an item. The price information can include the price of the item charged by a single seller or a group of sellers, as well as a customer's reaction to that price. The non-price information can contain any criteria other than the price of the item, including actual or anticipated inventory levels, initial cost, product life cycle, future demand, etc. The systems and methods can then adjust the price of the item for sale on an automated, or even semi-automated, basis without the need for manual intervention. The systems and methods could also contain a feedback mechanism that tracks the price adjustment and the conditions for making that adjustment, thereby aiding the formulation of pricing strategies for the item.

36 Claims, 6 Drawing Sheets

METHODS AND SYSTEMS FOR MANAGING PRICE AND INVENTORY ADJUSTMENTS

FIELD

This application relates generally to sales and pricing of items in a network-based environment. In particular, this application relates to systems and methods for determining and adjusting the price of an item offered for sale in a network-based environment.

BACKGROUND

Electronic commerce is an increasingly popular way of conducting business and selling items to customers. Customers are able to efficiently identify and purchase a wide variety of items, including both goods and services, over computer networks, including the Internet. The same goods and services can be offered by multiple sellers, each with its own conditions of sales e.g., taxes, shipping charges, promotions, rebates, etc.), allowing a customer to quickly and easily select an item from a given seller with the desired sales conditions.

One problem commonly encountered by such sellers is an inability to effectively price items to maximize profits and manage inventory such that each item is sold at an optimum profitable price. Pricing strategies employed by some sellers often lead to losses and inventory outages because they make their pricing strategy dependent on the pricing of another seller. For example, some sellers set their own price by using a competitor's price and then subtracting, e.g., 10%. Each seller often manually adjusts the price under such a pricing strategy hundreds or thousands of a time in every day. And since this strategy depends on the actions of another seller, it can lead to losses and inventory problems as prices decrease because each successive seller is undercutting the next. Indeed, a situation could develop where two competing sellers make their pricing strategies depend on each other and conceivably, the prices could be driven below cost and cause losses for both sellers.

Nor do such pricing strategies capture the actual price at which a customer would purchase an item. Since these pricing strategies focus on competitors, they do not account for any customer reaction to the price or any customer reaction to the item that is for sale. Thus, no idea exists as to whether the customer would pay more or less for the item. So some profit is lost in certain instances because the customer might pay more for an item. While in other instances, sales are lost because the customer thinks the price is too high.

There exist other problems that can be encountered by sellers in a network-based environment. Another problem is that many pricing strategies and methods are cumbersome and typically require manual input and effort to monitor the information about any given item in a timely manner. It is also not unusual for a seller to offer thousands of items at any given time, and adjusting the price for each one requires expensive time and manual effort. Such problems are compounded because new sellers are offering products via network-based sites at an increasing pace.

SUMMARY

Systems and methods for automating the price adjustments for items in a network-based environment are described in this application. The price adjustment can consider both the price information and non-price information of an item. The price information can include the price of the item charged by a single seller or a group of sellers, as well as a customer's reaction to that price. The non-price information can contain any criteria other than the price of the item, including actual or anticipated inventory levels, initial cost, product life cycle, future demand, etc. The systems and methods can then adjust the price of the item for sale on an automated, or even semi-automated, basis without the need for manual intervention. The systems and methods could also contain a feedback mechanism that tracks the price adjustment and the conditions for making that adjustment, thereby aiding the formulation of pricing strategies for the item.

BRIEF DESCRIPTION OF THE DRAWINGS

The following description can be better understood in light of the Figures, in which.

Figure 1:
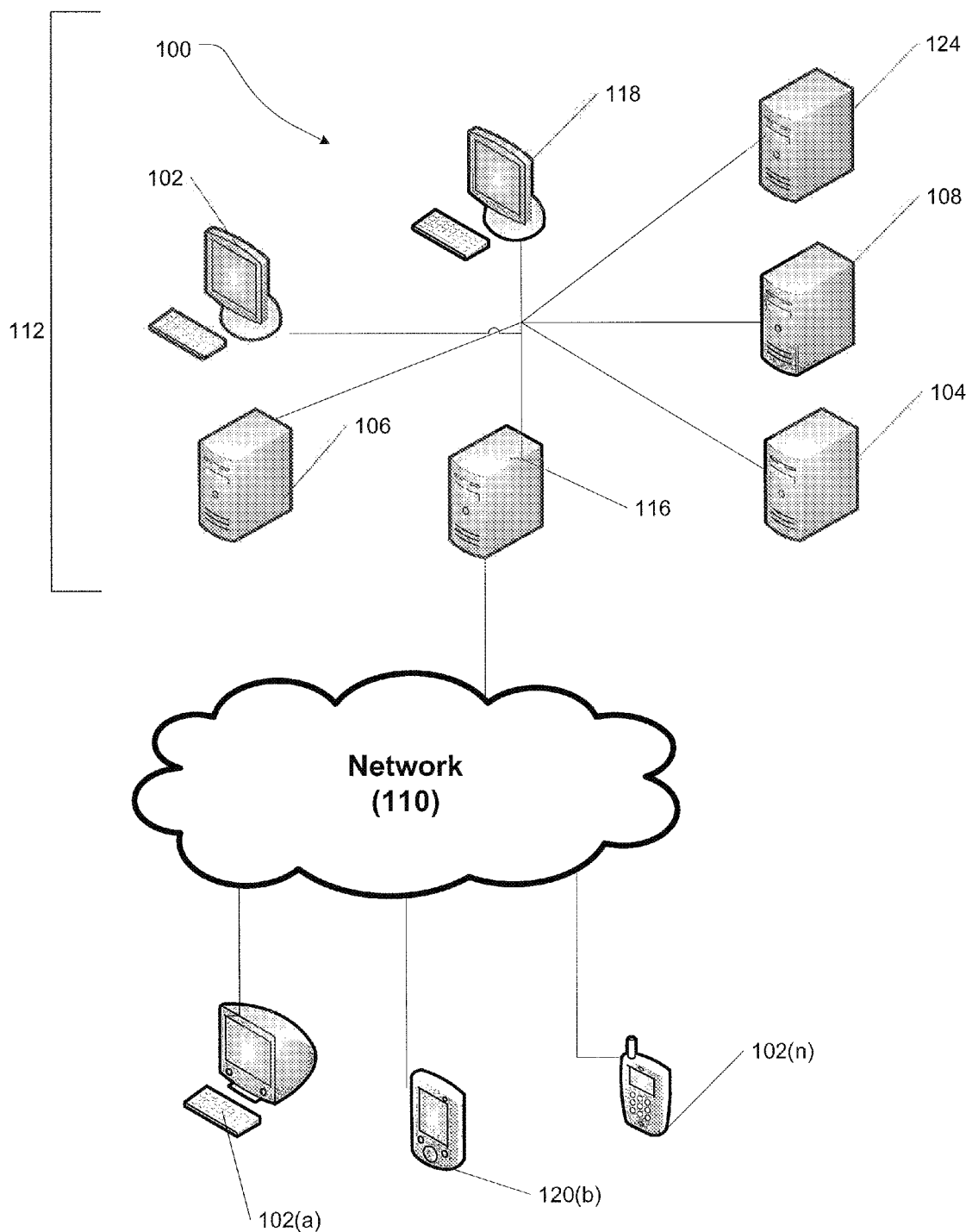
FIG. 1 contains a pictorial diagram illustrating a sample system for price adjustment.

Together with the following description, the Figures demonstrate and explain the principles of the system and methods for price adjustment. In the Figures, the thickness and configuration of components may be exaggerated for clarity. The same reference numerals in different Figures represent the same component.

DETAILED DESCRIPTION

The following description supplies specific details in order to provide a thorough understanding of the systems and methods for price adjustment of items for sale in network based environments. Nevertheless, the skilled artisan would understand that the systems and associated methods of using the systems can be implemented and used without employing these specific details. Indeed, the systems and associated methods can be placed into practice by modifying the illustrated systems and methods and can be used in conjunction with any apparatus and techniques conventionally used in the industry. For example, while the description below focuses on systems and methods for adjusting the price of items offered for sale in a network-based environment, it can be implemented in many other end uses, such as stand-alone computer environments, brick and mortar retailers that have a computerized means for shopping whether via a network or within the stores themselves.

FIG. 1 contains a pictorial diagram of an exemplary system 100 for price adjustment of an item. In FIG. 1, the system 100 includes a price information server 104 that determines price adjustments for goods and services (collectively and interchangeably referred to herein as item or items) that can be offered for sale to a customer by a seller. For clarity, a seller can include any entity offering items for sale or even offering services for sale, including displaying of items and/or order processing. The system 100 also includes a sales server 116, an inventory server 106, a non-price information server 108, and a catalog server 124 that facilitate browsing and purchasing of items by a customer using any number or combination of customer devices. The system 100 also contains a back-end interface 118 for a seller(s) to fulfill and order for any item(s) purchased by a customer using the customer devices.

Prior to discussing the details of system 100, it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computed components are distributed, the computer components are accessible to each other via communication links, such as those illustrated in FIG. 1. The system 100 could equally operate within a computer system having a fewer or greater number of components than those illustrated in FIG. 1. Thus, the depiction of system 100 should be taken as illustrative and not limiting. For example, the system 100 could implement various services components and peer-to-peer network configurations to implement at least a portion of the processes.

The system 100 contains a computer network 110. Computer networks are well known in the field of communications. Computer networks may include communication links that extend over a local area or a wide area, or even be global, as in the case of computer networks forming the Internet. In some embodiments, computer network 110 comprises the Internet. Protocols and components for communicating via the Internet are well known to those skilled in the art of computer communications and, thus, need not be described in more detail herein. Persons of ordinary skill in the art will recognize that other interactive environments that include local or wide area networks that connect sellers and customers for electronic commerce can be used in the system 100.

The customer devices that can be used in the system 100 can be any computing device that is capable of communicating over computer network 110. Examples of such computing devices include set-top boxes, personal digital assistants, wireless telephones, media players, web pads, electronic book readers, tablets, laptop computers, desktop computers, etc. In FIG. 1, the illustrative customer devices are depicted as a personal computer 102a, a personal digital assistant (PDA) 102b, and a wireless telephone 102n.

In the system 100 of FIG. 1, a computer 102 can be used for interfacing a user—such as a buyer—who is requesting price adjustments to items in the catalog server 124, with the system 100 through input and output means typical to a computer. The computer 102 may be any type of computing device, including one that allows an operator to interactively review information generated by or contain in the system 100, including any servers in the system. The computer contains both hardware and software components as known in the art.

The inventory server 106 maintains an accounting of the state of inventory for items sold or offered for sale by the system 100. The inventory server 106 can be updated in real time and reports a real time inventory accounting into the system 100. The inventory server 106 also can access a data store of items along with numeric representations of inventory conditions which can be requested, retrieved and viewed by the user via the computer 102 and/or the sales server 116.

The sales server 116 is generally responsible for providing front-end communication with the customer devices. This communication may include generating text and/or graphics, possibly organized as an interface using hypertext transfer or other protocols in response to information inquiries received from the various customer devices. The sales server 116 makes such item information available to a customer or a plurality of customers. The customer (or customers) may then purchase items from a seller (or sellers) in a single transaction (or a series or transactions) with the system 100.

The sales server 116 may also obtain and use information about the item for sale from the other servers in the system 100 to present to customers. For example, the sales server 116 may obtain information on available items directly from the catalog server 124, inventory server 106, and/or the non-pricing information server 108 as in conventional electronic commerce systems. In another example, the sales server 116 can obtain both price information and non-price information from the other servers.

The price server 104 stores and updates the current price of items along with the pricing history of items in the sales stream. The prices can be those offered by any individual seller or any combination of sellers. The pricing history includes all the data relating to the price of any item in the catalog server 124 offered by any given seller(s) at any point of time. The pricing server 104 can be updated dynamically in real time and can report real time price information.

The non-price server 108 stores and updates any and all information about the item other than its price. The non-price information can be for any item offered by any individual seller or any combination of sellers. The non-pricing server 108 can be updated dynamically and report its data dynamically in real time.

The catalog server 124 in system 100 is generally responsible for maintaining a comprehensive catalog of items that are available. This catalog may be maintained in a conventional data store stored in one or more memory storage devices within the catalog server 124. In some embodiments, the catalog server 124 may be in communication with other servers and data stores also storing catalog information for the items available, i.e., servers and databases that are operated by different sellers. Accordingly, the catalog server 124 may include and/or obtain information on items available from a plurality of sellers (as opposed to storing information for only a single seller). The sales server 116 may obtain such information from the catalog server 124 and make such item information available to a customer via a single Web site. A customer may then purchase items from a plurality of sellers in a single transaction or order placed via the sales server 116. This eliminates the need for the customer to visit or search multiple Web sites (e.g., one for each seller) and place multiple orders (e.g., one for each seller). In this regard, the sales server 116, catalog server 124, inventory server 106, non-price server 108, price server 104, and computers 102 and 104 may be referred to as an electronic marketplace 112. In some embodiments, the electronic marketplace 112 is operated by a proprietor who may also act as a seller. In other embodiments, however, the marketplace proprietor does not act as a seller since the sellers pay a fee or commission for the services of the marketplace proprietor in creating and operating the electronic marketplace 112.

The systems described above can be used in many methods for determining or adjusting the price of an item offered for sale in a network environment. For example, the systems described above can be used by the marketplace proprietor to determine a price adjustment of any item(s) based on the customer's reaction to the price or to the item itself. By using the customer's reaction and/or other market data, the proprietor can discover what the customer thinks of the item and adjust the price accordingly. Such feedback pricing thereby allows the proprietor to fine-tune the price and optimize it to achieve any specific purpose, such as achieving a desired profit target.

Figure 2:
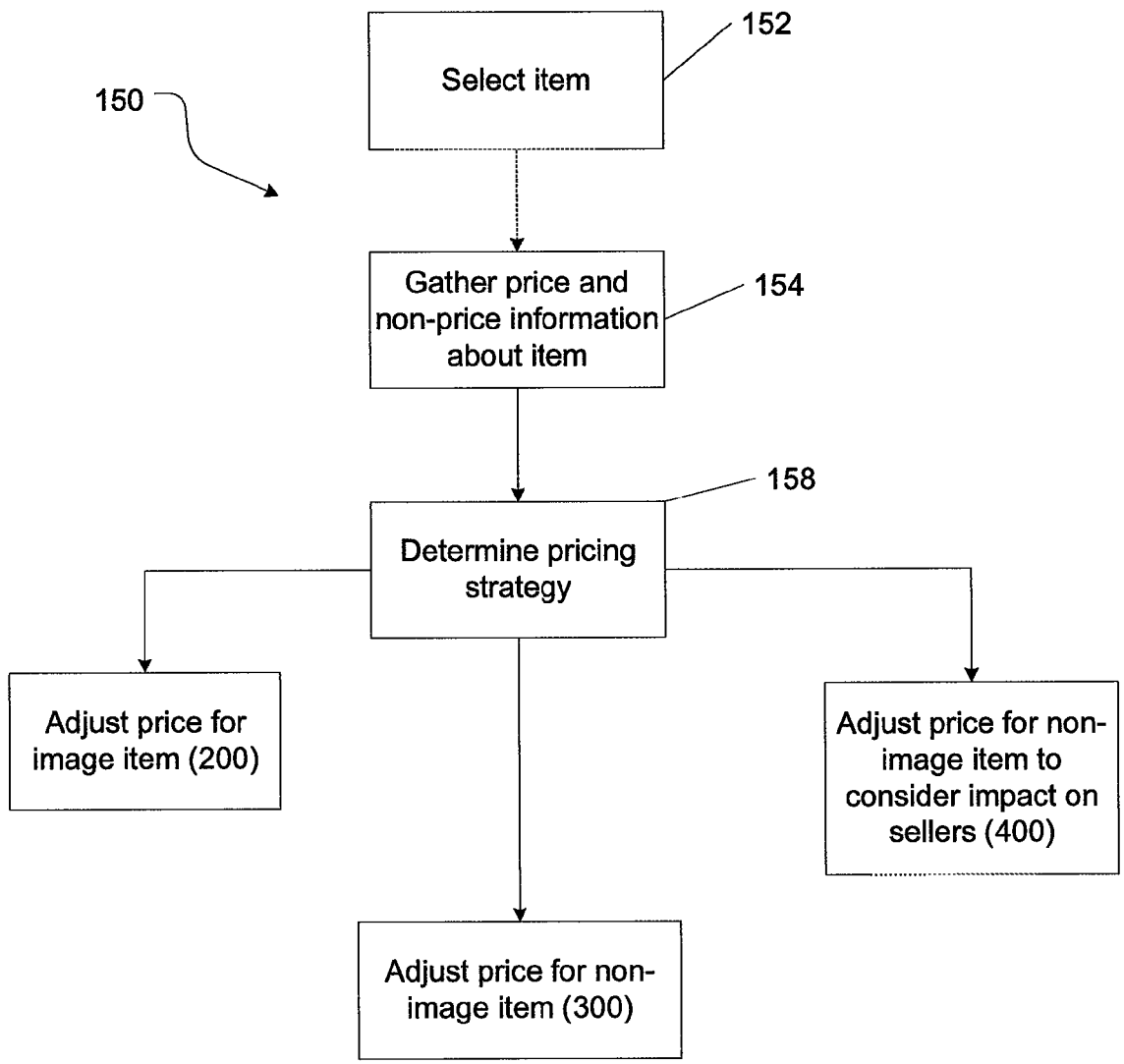
FIG. 2 contains a flow diagram illustrating a sample price adjustment method.

One illustrative method 150 for determining the price adjustment of an item is illustrated in FIG. 2. In this method, the marketplace proprietor discovers the customer reaction to any given item(s) or its price and collects both price information and non-price information about the item. With that information, the marketplace proprietor can then decide what type of pricing strategy will be used to determine a price adjustment. This pricing strategy can consider many factors, including what type of item is for sale and whether the marketplace proprietor will compete with any seller by selling the same item itself.

The method 150 begins with an item selection process, as shown in block 152. Either a specific item or a group of items may be selected for possible price adjustment. For instance, the item can be selected manually or automatically by the marketplace proprietor. An example of an automated selection by the proprietor includes a periodic (i.e., hourly) check on the prices currently offered for all of the items in the electronic marketplace 112. An example of a manual selection by the proprietor includes a specific check on the price currently offered for a single item in the electronic marketplace 112. In yet another example, a buyer for the marketplace proprietor (e.g., an employee who purchases items to be offered for sale by the proprietor in the electronic marketplace 112) manually selects a group of items for which he or she believes that a price adjustment may be desirable.

Once an item(s) has been selected, price and/or non-price information about the item is gathered, as shown in block 154. The price information includes, as noted above, the current price for the item and any price history for the item. The price of any item may also include all—or only some of—the costs associated with the sale of the item and may include, among other considerations, shipping, handling, storage, etc. The price information can be gathered by the marketplace proprietor using the information stored in the price server 104.

The non-price information can include information about the item other than the price information. Examples of the non-price information include inventory condition, any business strategy for that item or product line to which the item belongs, customer discounts, taxes, next expected shipment, fulfillment center location, previous customer interest as demonstrated by tracking of customer behavior (i.e., customer views), or any combination thereof. The non-price information can be gathered by the marketplace proprietor using the information stored in the non-price server 108 or using an automated search process of other servers via the communication network 110.

The marketplace proprietor then selects or determines a pricing strategy, as depicted in block 158. The pricing strategy is that strategy the marketplace proprietor will follow in determining the price adjustment for the item. In one embodiment, the pricing strategy includes what type or classification of item is for sale, i.e., whether the item is an image item or a non-image item. Where a seller desires to be the price leader for an item regardless of cost or loss, i.e., profitability, the item is referred to as an image item. Generally these items are items where pricing is generally known, the volume of traffic looking for such an item is high, and/or a lowest price is immediately recognized. For example, a seller wanting a reputation of a low price leader may choose to have these popular items priced lower than other sellers. In other words, the item can be offered to customers below actual cost to the seller so that the seller develops a reputation as being a price leader.

A non-image item includes an item of which the seller wants to be competitive, yet places profitability over raw sales or image, as a pricing strategy. Under this pricing strategy, adjustments will be made to insure that the seller remains profitable or the sale will not be made. Where desired, limitations other than profitability can be placed to control the price adjustments that may be used for non-image items. Thus, adjusting the price can be kept within the constraints of profitability (or other target such as, for example, market share) for the seller.

Another of the factors used in determining the pricing strategy includes the impact of the proprietor's participation as a seller will have on other sellers in the electronic marketplace. In certain instances, the proprietor will not desire to act as a seller and will not compete with any other seller in the electronic marketplace. In other instances, though, the proprietor may wish to act as a seller and compete with other sellers in the electronic marketplace.

Once a pricing strategy is determined, the method 150 advances to one of three price processing subroutines. If the item is assigned a pricing strategy for an image item, a first price adjustment subroutine for an image item is then applied, as shown in block 200. If the item is assigned a pricing strategy for a non-image item without regard to the impact on other sellers in the electronic marketplace, a second price adjustment for a non-image item is then applied, as shown in block 300. If the item is assigned a pricing strategy for a non-image item with regard to the impact on other sellers in the electronic marketplace, a third price adjustment subroutine for a non-image item is then applied, as shown in block 400. Of course, more pricing strategies (or a combination of these pricing strategies) may be used to dynamically adjust the prices of items without departing form the spirit and scope of the present disclosure.

The method illustrated in FIG. 2 can be implemented by the marketplace proprietor using any computer executable code that performs the process described above. In one embodiment, the computer executable code resides on the sales server 116. This computer executable code may be referred to as a price adjusting engine. The price adjusting engine then can be used by the marketplace proprietor to determine the desired pricing strategy. Since that pricing strategy considers whether the item is an image item or non-image item, the price adjusting engine can be used to present a series of queries to the marketplace proprietor to decide whether the item is an image item or non-image item. Since the pricing strategy also considers whether the marketplace proprietor would like to compete with other sellers, the price adjusting engine can be used to present a series of queries to the marketplace proprietor to make such a determination. Those queries may be manually or automatically answered by the marketplace proprietor.

In some embodiments, the price adjusting engine can dynamically determine whether a selected item is an image item. In some instances, this determination can be made automatically based on aggregate customer behavior with respect to the item. For example, metadata can be associated with the item and can contain a marker identifying it as an image item. In another example, the previous sales behavior of a single customer, or a number of customers, can be considered in verifying whether an item qualifies as an image item. Indeed, the customer behavior is not limited to sales behavior but can include any of the actions of the customer leading up to the decision to purchase or not purchase, such as how many times a customer has viewed the item.

The price adjusting engine then determines the price adjustment (and then optionally adjusts the price) according the pricing strategy for the item as depicted in FIG. 2. The procedure of actually adjusting the price is optional since the marketplace proprietor can always decide not to adjust the price even if the price adjusting engine determines that the price should be adjusted.

In some embodiments, the price adjusting engine can be operated continuously. By running continuously, each item can be sold at a desired, optimum, or even maximized price, limited only by operational constraints, such as system speed. In addition, the price adjusting engine can be terminated at any time when needed. For example, the price adjusting engine can be terminated when it has exceeded operation limits placed on it, such as limits on the iterations run per day and price adjustment range.

The price adjusting engine thereby allows the marketplace proprietor to know and impact the entire pricing strategy without merely considering a competitor's price. Using the customer's reaction to the price or to the item itself (or other market data), the proprietor can discover what the customer's impressions of the item and any associated price. After modifying the price, the proprietor can then watch how the customer's impressions change. This feedback can allow the proprietor to optimize the price to achieve any desired purpose, such as the proprietor achieving a desired profit target or becoming a sales leader for that item.

Figure 3:
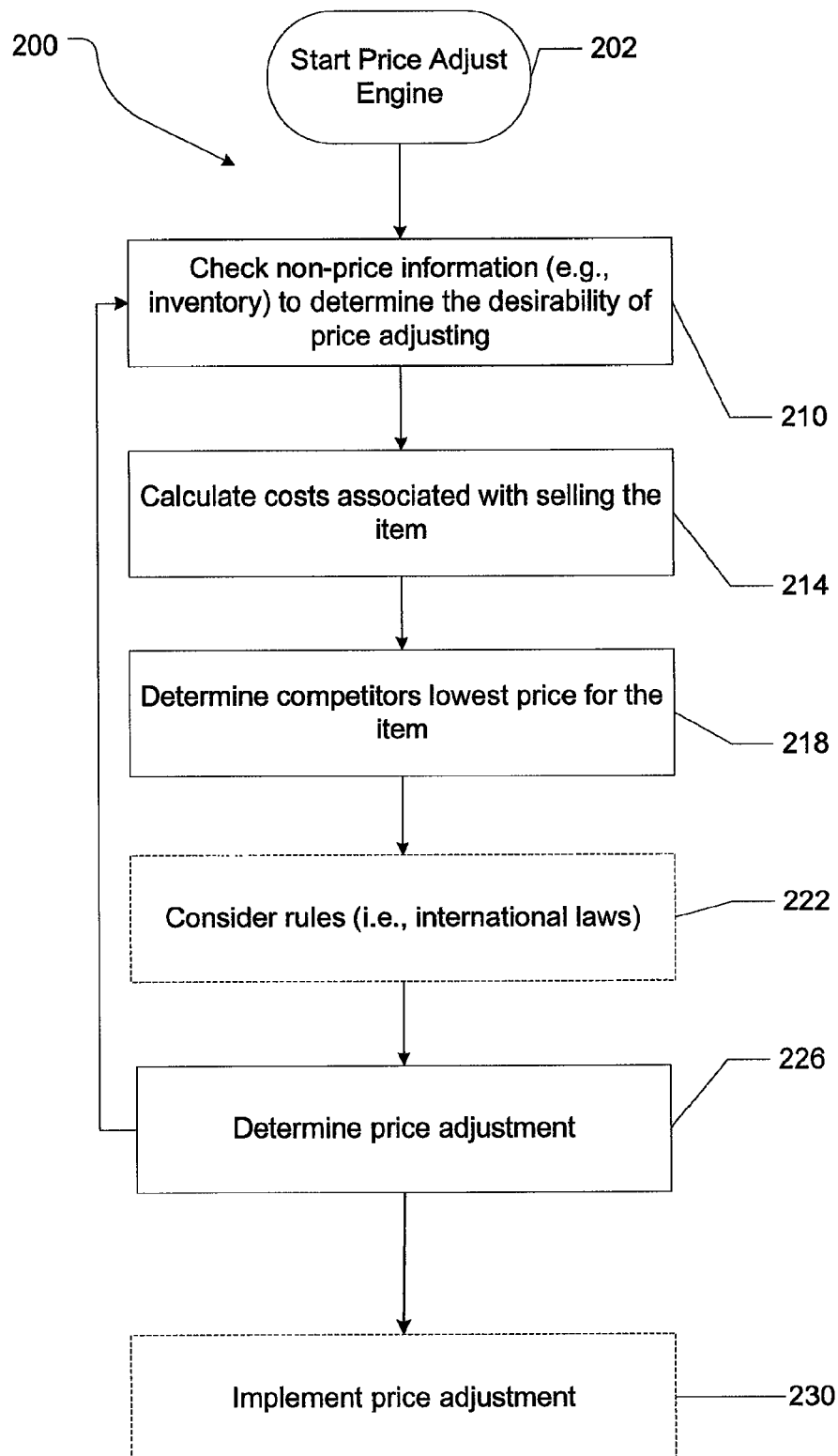
FIG. 3 contains a flow diagram illustrating a sample price adjustment subroutine for image items.

FIG. 3 illustrates one example of how the price adjusting engine can be used to determine a price adjustment (and optionally implement the price adjustment) where the item is an image item. As noted in FIG. 2, this subroutine 200 begins after the image item pricing strategy has been determined. The subroutine begins when the price adjusting engine is triggered. As noted above, in some embodiments the price adjusting engine may be triggered at block 202 when the item has been selected. In other embodiments, though, the price adjusting engine may be triggered as a result of some other request, e.g., for batch price adjustment processing.

Since the item is an image item (e.g., an item for which a seller wishes to be a price leader), non-price information can be evaluated to determine the desirability of adjusting the price for an item, as shown in block 210. For example, the non-price server 108 can be queried for any non-price information described above. Such information may be stored locally to the non-price server or the electronic marketplace 112. In other embodiments, non-price information may be obtained by conducting a search for such information via the network 110. In some instances, inventory information may also need to be considered. Accordingly, non-price information such as inventory information may be obtained from the inventory server 106. The inventory information may include the number of items available for sale, the location of the inventory, timing of future additions to the inventory, etc. The non-pricing information may also contain trending data from seller experience on the life cycle of similar categories of products.

Next, the costs associated with the sale of the item are calculated, as shown at block 214 in FIG. 3. As discussed briefly above, the costs associated with the marketplace provider's purchase of the item, e.g., initial transport to the seller, warehousing the item, marketing the item, shipping/handling of the item, etc., are calculated. Other costs may include the volatility of an item, which is the likelihood the item will fail and be returned, or simply be returned at a customer's discretion.

Next, price information for the item may be obtained and used to determine the lowest price offered by a competitor for the same item, as shown in block 218. Typically, the price information includes the price offered by the marketplace proprietor (or other predetermined seller), any seller(s) in the electronic marketplace 112, as well as prices offered by competitors for the same item. In one embodiment, price information is stored locally to the price server and/or electronic marketplace 112, e.g., in a searchable database. In other embodiments, such competitive price information may be obtained by conducting a search for such information via the network 110. A competitive monitoring server could be included in the system and used to perform a search for the competitive price information via network 110 using standard or customized search protocols. The search may be performed directly on a competitor's site or through a third party pricing agent.

Optionally, the subroutine 200 can perform an automated price adjustment check against any known rules that can impact the pricing, as shown at block 222 in FIG. 3. One example of such rules includes the limitations that any national or international laws might have on the sale, i.e., import conditions or treaties. Another example of such rules includes contractual arrangements (e.g., geographic scope of a license), or other legal limitations. These rules can be digitized into operational rules in the price adjustment engine that restrict how or to what degree the price may be adjusted. This checking process 222 may be performed contemporaneously or in conjunction with other processes of the method 200.

The price adjustment can then be determined, as enumerated as block 226 of FIG. 3. The price adjustment can be dynamically determined by the marketplace proprietor based on a pricing strategy for an image item, which takes into consideration the competitive price information and the non-price information collected as described above. The price adjustment is then stored in the sales server 116 for later retrieval, i.e., when the proprietor wants to optionally implement the price adjustment, as shown at block 230. For example, given the lowest competitive price found in block 218 and the inventory condition of the item, the price adjusting engine may determine a price adjustment for the selected item that, when implemented, would cause the proprietor of the electronic marketplace 112 to offer the item at a price equal to the lowest competitive price. In yet another example, the price adjusting engine may determine a price adjustment for the selected item that result in a price that betters the lowest competitive price by a predetermined amount (e.g., $5) or a predetermined percent (e.g., 5%) However, if additional operational rules are applied, it is possible that a price adjustment may be limited or prevented, e.g., if such a price adjustment is limited by an import restriction.

Figure 4:
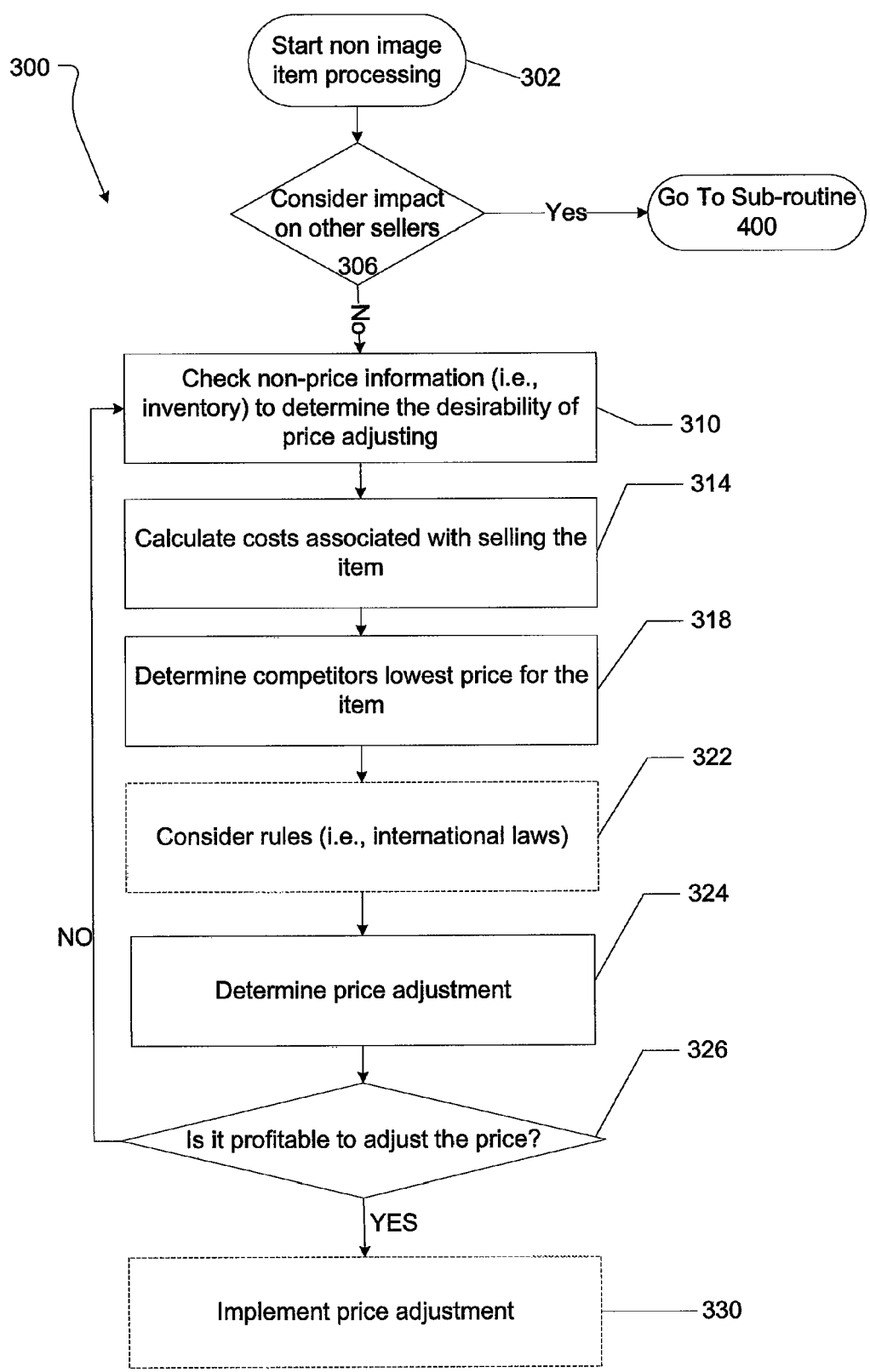
FIG. 4 contains a flow diagram illustrating a sample price adjustment subroutine for non-image items in some embodiments.

Blocks 210 to 226 of the subroutine 200 can, if desired, be repeated to create a feedback loop as shown in FIG. 3. This feedback loop allows the marketplace proprietor to observe the elasticity of the item as the price is adjusted. For example, the feedback loop could allow the marketplace proprietor to optimize the price to make sure that a certain number of any desired item is sold, e.g., more than any other seller so that the proprietor can obtain the desired status of being the market leader. Such feedback may be incorporated and stored with the price information and/or non-price information.

Where the item is a non-image item, FIG. 4 illustrates one example of how the price adjusting engine can be used to determine a price adjustment (and optionally implement the price adjustment). As noted in FIG. 2, this subroutine 300 begins after the pricing strategy has been determined. The subroutine begins when the price adjusting engine is triggered at block 302. As noted above, in some embodiments the price adjusting engine may be triggered when the item has been selected. In other embodiments, though, the price adjusting engine may be triggered as a result of some other request, e.g., for batch price adjustment processing.

As shown at block 306, the proprietor must decide whether to consider the impact of his participation as a seller on other sellers in the electronic marketplace. In some embodiments, the impact of his participation (and the resulting price adjustment) on other sellers will be considered by the marketplace proprietor. In these embodiments, the proprietor will determine the price adjustment for the non-image item in light of the impact that price adjustment will have on other sellers in the electronic marketplace. In these embodiments, adjustments will be made to the price to insure that the proprietor remains profitable, but not at the expense of the profitability of other sellers in the electronic marketplace. In these embodiments, the proprietor can still make the sale on behalf of the other seller and receive a commission on the sale, rather than acting as a seller itself. If the proprietor decides to consider such an impact, the price adjusting engine will perform the subroutine 400 in FIG. 5. In other embodiments, though, the proprietor will determine the price adjustment for the non-image item without considering this impact.

The subroutine 300 continues to block 310 where the non-price information is evaluated to determine the desirability of adjusting the price for an item. For example, the non-price server 108 can be queried for any non-price information described above. In some instances, inventory information may also need to be considered. Accordingly, non-price information such as inventory information may be obtained from the inventory server 106. The inventory information may include the number of items available for sale, the location of the inventory, timing of future additions to the inventory, etc. In one instance, if inventory for a selected item is high but sales have been slow, the price adjusting engine may determine that an adjustment is desirable. The non-pricing information may also contain trending data from seller experience on the life cycle of similar categories of products. For example, if an item is soon to be replaced with an upgraded version, the price adjusting engine may determine that an adjustment is desirable in an effort to sell the remaining inventory of the item.

Next, if it is determined that price adjustment is desirable, the costs associated with the sale of the item are calculated, as shown at block 314 in FIG. 4. As discussed above, the costs associated with the marketplace proprietor's purchase of the item, e.g., initial transport to the marketplace proprietor, warehousing the item, marketing the item, shipping/handling of the item, etc., are calculated. Other costs may include the volatility of an item, which is the likelihood the item will fail and be returned, or simply be returned at a customer's discretion. As will be described in more detail below, such "non-price" information may be used to determine whether the marketplace proprietor would be profitable if the price adjustment was carried out.

Next, price information for the item may be obtained and the lowest competitive price determined, as shown in block 318. Typically, the price information includes the price offered by the marketplace proprietor (or other predetermined seller), any seller(s) in the electronic marketplace 112, as well as prices offered by competitors for the same item. As noted above, such competitive price information may be obtained by conducting a search for such information via the network 110. A competitive monitoring server could be included in the system and used to perform a search for the competitive price information via network 110 using standard or customized search protocols. The search may be performed directly on a competitor's site or through a third party pricing agent.

Optionally, the subroutine 300 can perform an automated price adjustment check against any known rules that can impact the pricing, as shown at block 322 in FIG. 4. One example of such rules includes the limitations that any national or international laws might have on the sale, i.e., import conditions or treaties. Another example of such rules includes contractual arrangements (or other legal arrangements). Yet another example of these rules includes business rules which could prevent the price adjustment or merely limit the amount of the price adjustment, e.g., the price cannot be lowered than a certain amount (x number of dollars) or a certain percentage (y%). These rules can be digitized into operational rules in the price adjustment engine that restrict how the price may be adjusted. This checking process 322 may be performed contemporaneously or in conjunction with other processes of the method 300.

The price adjustment can then be determined, as enumerated as block 324 of FIG. 4. The price adjustment can be dynamically determined by the marketplace proprietor using the sales server 116. The price adjustment is then stored in the sales server 116 for later retrieval, i.e., when the proprietor wants to implement the price adjustment. As noted above, given the lowest competitive price calculated in block 318 and any non-price information, e.g., inventory condition of the item, the price adjusting engine may determine a price adjustment for the selected item that, when implemented, would cause the proprietor of the electronic marketplace 112 to offer the item at a price equal to or better than the lowest competitive price. As also noted above, any operational rules may optionally be applied to determine if the price adjustment should be applied or limited in some manner.

In block 326, the price adjusting engine then determines whether the marketplace proprietor would be profitable if the price adjustment was carried out. As noted above, whether or not the proprietor makes a profit is not the primary consideration when selling image items. But for non-image items, selling the item for a profit or achieving a specific profit margin can be a primary consideration for the proprietor. If the desired profitability can be obtained by the price adjustment, the price can then optionally be adjusted, if desired, as shown at block 330. If the desired profitability cannot be obtained by the price adjustment, the method 300 can repeat steps 310, 314, 318, 322, and 324 (as necessary). It will be appreciated by those skilled in the art that the profitability determination may be made automatically by applying certain business rules to the price adjustment and taking into consideration the costs associated with selling the item, e.g., by determining if application of the price adjustment meets or exceeds a minimum profit margin, or manually by marketplace proprietor, e.g., by presenting the price adjustment to a buyer for review and approval.

Even if the desired profitability can be obtained, blocks 310 to 326 of the subroutine 300 can be repeated to create a feedback loop. This feedback loop allows the marketplace proprietor to observe the elasticity of the non-image item as the price is adjusted. As noted above, the feedback may be in the form of price or non-price information. For example, the feedback loop could allow the marketplace proprietor to optimize the price adjustment to make sure that a certain profit margin is reached.

Figure 5:
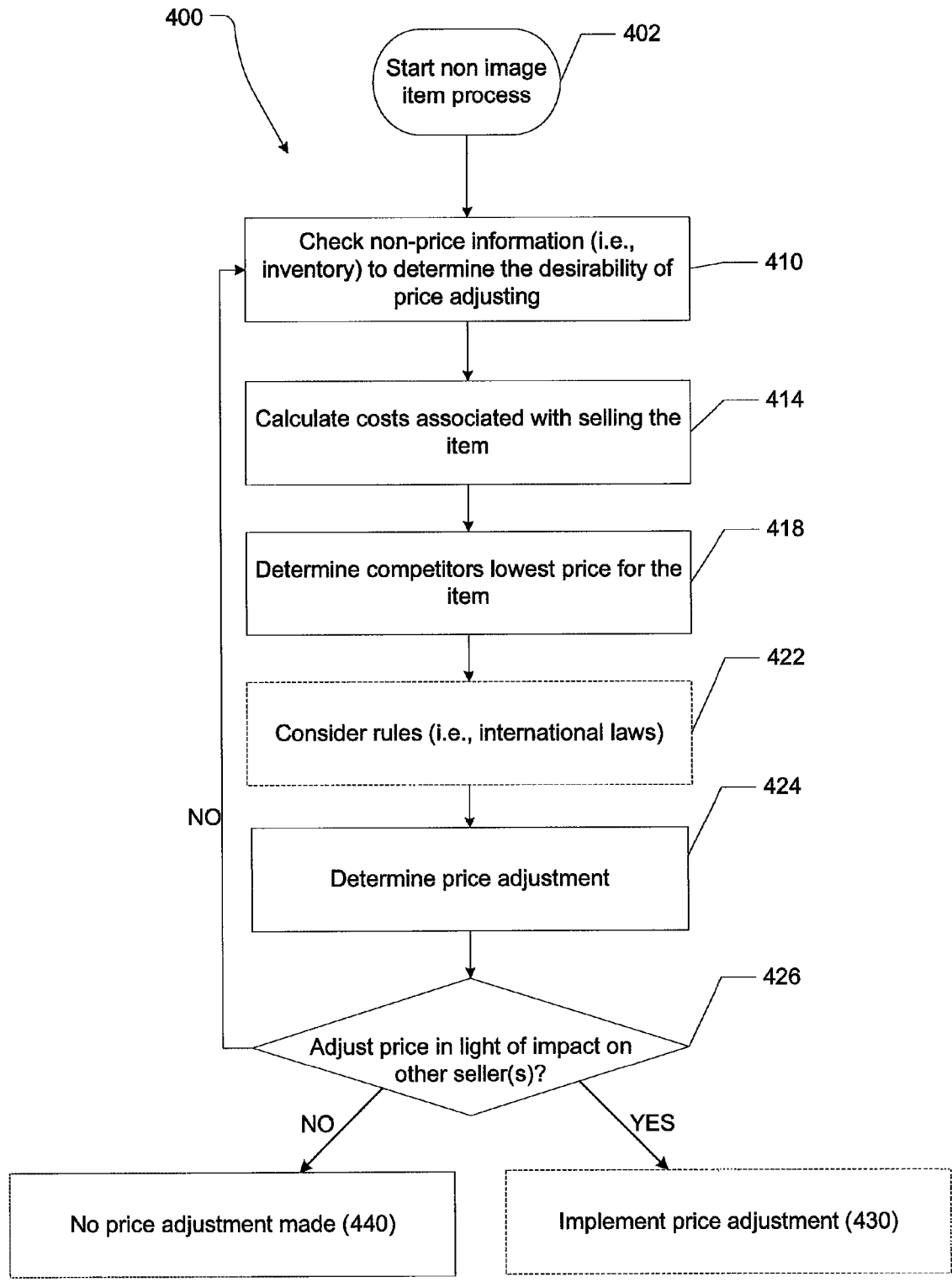
FIG. 5 contains a flow diagram illustrating a sample price adjustment subroutine for non-image items in other embodiments.

As noted above, FIG. 4 illustrates one example of how a price adjusting engine can be used to determine a price adjustment for a non-image item without considering what impact the sale by the marketplace proprietor will have on the other sellers in the electronic marketplace 112. However, given that sellers may pay the marketplace proprietor a commission when an item is sold via the electronic marketplace 112, it may be more desirable for the marketplace proprietary to defer sale of a non-image item by a seller rather than sell the non-image item itself. Accordingly, it may be desirable to consider the image of the price adjustment to the non-image item offered by the marketplace proprietor on the other sellers. FIG. 5 illustrates one example of how the price adjusting engine can be used to determine a price adjustment (and optionally implement the price adjustment) in light of the impact it will have on other sellers. As noted in FIG. 2, this subroutine 400 begins after it has been determined to apply a pricing strategy for a non-image item. The subroutine begins when the price adjusting engine is triggered at block 402. As noted above, in some embodiments the price adjusting engine may be triggered when the item has been selected. In other embodiments, though, the price adjusting engine may be triggered as a result of some other request, e.g., for batch price adjustment processing.

The subroutine 400 continues when the non-price information is evaluated to determine the desirability of adjusting the price for a non-image item, as shown in block 410. For example, the non-price server 108 can be queried for any non-price information described above. In some instances, inventory information may also need to be considered. Accordingly, non-price information such as inventory information may be obtained from the inventory server 106. The inventory information may include the number of items available for sale, the location of the inventory, timing of future additions to the inventory, etc. The non-pricing information may also contain trending data from seller experience on the life cycle of similar categories of products. As noted above, if inventory for a selected item is high but sales have been slow, the price adjusting engine may determine that an adjustment is desirable. As yet another example, if an item is soon to be replaced with an upgraded version, the price adjusting engine may determine that an adjustment is desirable in an effort to sell the remaining inventory of the item.

Next, if a price adjustment is desirable, the costs associated with the sale of the item may be calculated, as shown at block 414 in FIG. 5. As discussed above, the costs associated with marketplace provider's purchase of the item, initial transport to the marketplace, warehousing the item, marketing the item, shipping/handling of the item, etc. Other costs may include the volatility of an item, which is the likelihood the item will fail and be returned, or simply be returned at a customers' discretion. As noted above, such "non-price" information may be used to determine whether the marketplace proprietor would be profitable if the price adjustment was carried out.

Next, price information for the item may be obtained, as shown in block 418. Typically, the price information includes the price offered by the marketplace proprietor (or other predetermined seller), any seller(s) in the electronic marketplace 112, as well as prices offered by competitors for the same item. Such competitive price information may be obtained by conducting a search for such information via the network 110. A competitive monitoring server could be included in the system and used to perform a search for the competitive price information via network 110 using standard or customized search protocols. The search may be performed directly on a competitor's site or through a third party pricing agent.

Optionally, the subroutine 400 can perform an automated price adjustment check against any known rules that can impact the pricing, as shown at block 422. One example of such rules includes the limitations that any national or international laws might have on the sale, i.e., import conditions or treaties. Another example of such rules includes contractual arrangements (or other legal arrangements). Yet another example of these rules includes business rules which could prevent the price adjustment or merely limit the amount of the price adjustment, e.g., the price cannot be lowered than a certain amount (x number of dollars) or a certain percentage (y%). These rules can be digitized into operational rules in the price adjustment engine that restrict how the price may be adjusted. This checking process 422 may be performed contemporaneously or in conjunction with other processes of the method 400.

The price adjustment can then be determined, as enumerated as block 424 of FIG. 5. The price adjustment can be dynamically determined by the marketplace proprietor using the sales server 116. The price adjustment is then stored in the sales server 116 for later retrieval, i.e., when the proprietor wants to implement the price adjustment.

In block 426, the price adjusting engine then determines whether the price adjustment should be carried out in light of the impact on other sellers. In the subroutine 300, the proprietor determines the price adjustment for the non-image item without considering any impact of the price adjustment on other sellers in the electronic marketplace. But in subroutine 400, the proprietor determines the price adjustment in light of such an impact. Thus, adjustments will be made to the price to insure that the proprietor remains profitable, but not at the expense of other seller's profitability in the electronic marketplace. The proprietor can still make the sale on behalf of the other seller and receive a commission on the sale, rather than acting as a seller itself. Thus, as shown at block 430, the price can be optionally adjusted by the proprietor where it will obtain the desired profitability without adversely impacting other seller's profitability. If not, the method 400 can repeat steps 410, 414, 418, 422, and 424 until such a condition is met or the price adjusting engine discovers that further iterations will not meet such a condition (as shown at block 440). In that instance, the marketplace proprietor will not act as a seller, choosing instead to obtain a commission from other sellers.

Even if such a condition can be met, blocks 410 to 426 of the subroutine 400 can be repeated to create a feedback loop. This feedback loop allows the marketplace proprietor to observe the elasticity of the non-image item as the price is adjusted. For example, the feedback loop could allow the marketplace proprietor to optimize the price adjustment to make sure that any price adjustment will have no—or negligible—impact on any given seller.

Figure 6:
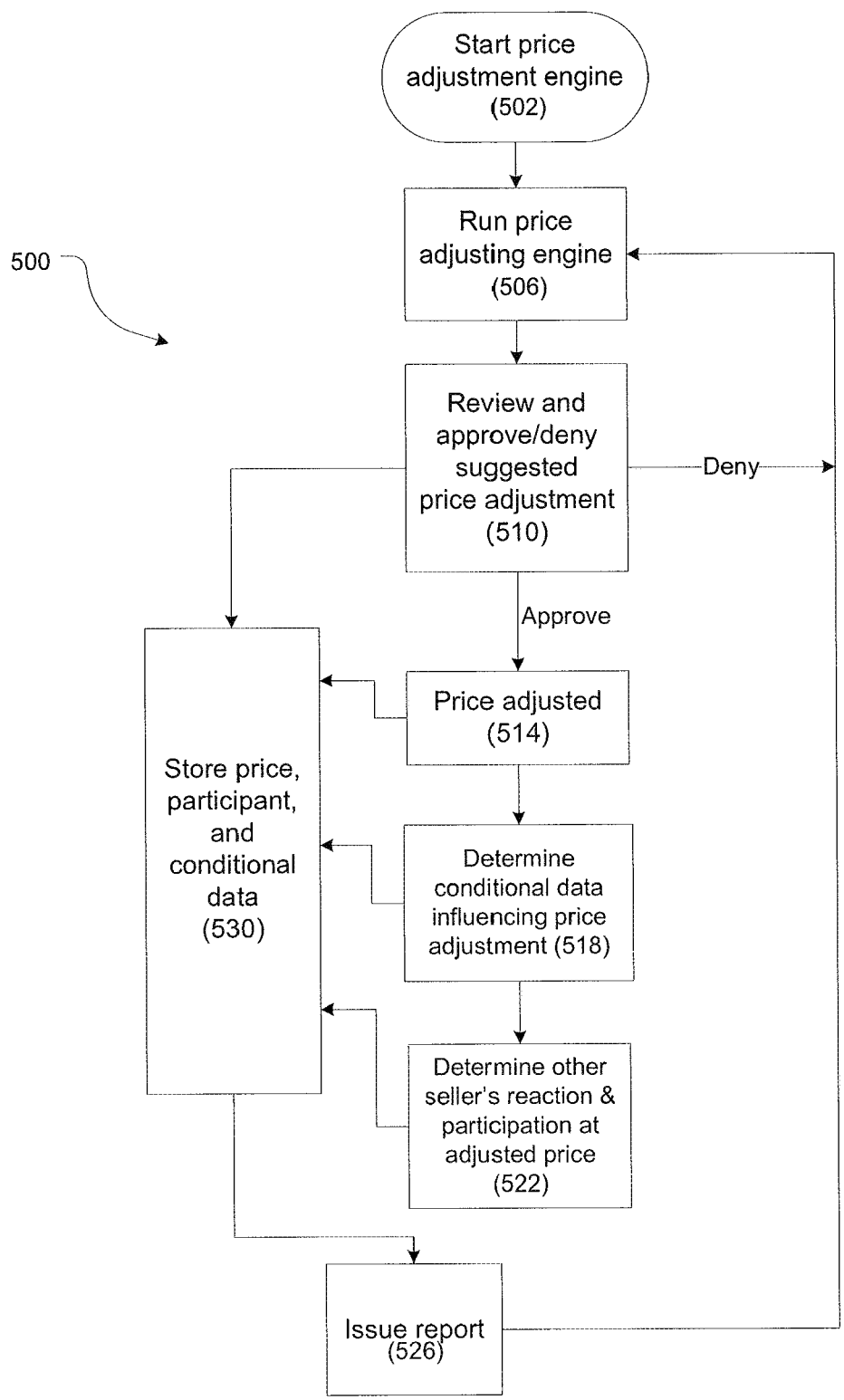
FIG. 6 contains a flow diagram illustrating a sample monitoring and tracking routine.

All of the subroutines described above contain a feedback loop that allows the marketplace proprietor to optimize the price adjustment for an item. But the operation of the price adjusting engine itself can also be optimized by tracking and monitoring the price adjustment and why the price was adjusted. FIG. 6 illustrates one example of a method 500 where price adjustment tracking and monitoring can be used to optimize the operation of price adjusting engine.

The method 500 begins by starting the price adjusting engine, as shown in block 504. Next, the price adjusting engine is then operated, as shown in block 506. Both the starting and operation of the price adjusting engine can be carried out similar to the methods described above.

Next, the price adjustment determination produced by the price adjusting engine can be reviewed and approved (or denied) by the marketplace proprietor, as illustrated at block 510. This approval may be performed manually or automatically by the marketplace proprietor as described above. If the price adjustment is not approved, the price adjusting engine is operated again using the feedback loops described above. By performing an approval/denial process, non-recurring influences (e.g., sudden shortages in an item) that are not anticipated can be accounted for and corrected.

When approved, the price is adjusted by the marketplace proprietor, as shown in block 514. The new price, and the change to the price, is stored in the price server 104, as shown in block 530.

Next, the specific non-pricing data that were considered by the marketplace proprietor in the price adjustment (the conditional data) can be monitored and tracked, as shown in block 518, and stored in the non-price server 108, as shown in block 530. For example, a proprietor may have only considered its own inventory in determining the price adjustment for an item, rather than all of the non-price data available. Accordingly, the conditional data contains only the information about the proprietor's inventory, why that was used, and why no other non-pricing data was used.

Once the price is adjusted by the proprietor, other sellers in the electronic marketplace may react to the price adjustments. One expected reaction is that the other sellers may change their own prices in response. These seller's reaction and participation (if any) is tracked, as shown in block 522. The reaction and participation data is stored in the sales server 116, as shown in block 530.

A reporting step 526 can then be performed using all of this compiled data. The reporting step 526 can improve the operation of the price adjusting engine by showing where gaps exist in the pricing information or non-pricing information, as well as pinpointing gaps in the analysis performed by the price adjusting engine. Further, the reporting step improves the operation of the price adjusting engine by showing how the market reacts to the price adjustment determined by the price adjusting engine. This information can then be used in future iterations of the method 500.

Any of the systems and methods for determining the price adjustment described above can be operated manually or automatically. The automation can reduce the manual effort and time needed to update the information and monitor the progress of the large number of items that can be offered for sale. Even when they are operated manually, the systems and methods can consider non-pricing information which traditionally not been considered. When operated automatically (or semi-automatically), not only do they consider the non-pricing information, but they can also adjust the price without the need for any manual intervention. Without the need to constantly monitor the price and manually adjust it to stay competitive, a seller can focus by competing on non-price parameters. For example, a seller can monitor internal inventory parameters and compare them with a competitor's inventory parameters in an effort to stay competitive. In another example, a seller can monitor profit margins and compare them with a competitor's profit margins in an effort to stay competitive.

The price adjusting engine can be especially helpful to the marketplace proprietor to watch both price and non-price elasticity of any given item for sale. Using the price adjusting engine, the proprietor can quickly and efficiently isolate a single criterion of the sales transaction, change that criteria, watch how the customer responds to that change, and then determine an appropriate price adjustment using the customer response. For example, if the electronic marketplace was selling a dark red t-shirt, the proprietor could isolate the color and change it to lighter shade of red, watch customers' reactions (i.e., less or more views, shorter or longer views, less or more purchases), and then determine whether the price of the t-shirt (with a lighter red color) could be raised by $0.25.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Although shown in succession, the steps in any method may also be done simultaneously, or in another order than what is shown. Also, as used herein, examples are meant to be illustrative only and should not be construed to be limiting in any manner.

We claim:

1. A computer-implemented method for determining an adjusted price for an item offered for sale, comprising:
    compiling pricing data about the item using an automated searching process;
    compiling non-pricing data for the item using another automated searching process, the non-pricing data including inventory data for the item;
    classifying the item as an image item when the adjusted price is to be determined without regard to profitability;
    classifying the item as a non-image item when the adjusted price is to be determined with regard to profitability; and
    automatically determining an adjusted price for the item based at least in part on the pricing data and the non-pricing data, the adjusted price being unconstrained relative to a cost of the item when the item is an image item, and the adjusted price being constrained to be greater than the cost when the item is a non-image item.

2. The computer-implemented method of claim 1, wherein the item is offered for sale by a proprietor of an electronic marketplace including at least one other seller, wherein the adjusted price is based at least in part on a projected impact of the adjusted price on sales of the item by the at least one other seller.

3. A computer-implemented method for determining an adjusted price for an item offered for sale, comprising:
    providing pricing data for the item;
    providing non-pricing data for the item, the non-pricing data comprising inventory data;
    classifying the item as an image item when the adjusted price is to be determined without regard to profitability;
    classifying the item as a non-image item when the adjusted price is to be determined with regard to profitability; and
    automatically determining the adjusted price for the item using the pricing data and the non-pricing data, the adjusted price being unconstrained relative to a cost of the item when the item is an image item, and the adjusted price being constrained to be greater than the cost when the item is a non-image item.

4. The computer-implemented method of claim 3, further comprising determining a lowest competitive price for the item from the pricing data.

5. The computer-implemented method of claim 4, further comprising applying the adjusted price to the item.

6. The computer-implemented method of claim 5, wherein the adjusted price is automatically determined also using the lowest competitive price.

7. The computer-implemented method of claim 6, wherein the adjusted price, when applied, results in a price that is equal to the lowest competitive price.

8. The computer-implemented method of claim 6, wherein the adjusted price, when applied, results in a price that is lower than the lowest competitive price.

9. The computer-implemented method of claim 5, further comprising limiting the application of the adjusted price to the item based on operational rules, the operational rules including at least one contractual restriction.

10. The computer-implemented method of claim 5, further comprising limiting the application of the adjusted price to the item based at least in part on a profitability threshold when the item is a non-image item.

11. The computer-implemented method of claim 5, wherein the item is offered for sale by a proprietor of an electronic marketplace including at least one other seller, wherein the adjusted price is automatically determined also using a projected impact of the adjusted price on sales of the item by the at least one other seller.

12. The computer-implemented method of claim 3, further comprising providing the pricing data using an automated searching process.

13. The computer-implemented method of claim 3, further comprising providing the non-pricing data using an automated searching process.

14. The computer-implemented method of claim 3, wherein the non-pricing data further comprises initial cost data, product life cycle data, and future demand data.

15. A computer-implemented method for determining a respective adjusted price for a first item and a second item offered for sale in a network based environment, comprising:
    classifying the first item as an image item when the respective adjusted price is to be determined without regard to profitability;
    classifying the second item as a non-image item when the respective adjusted price is to be determined with regard to profitability;
    providing a respective pricing strategy for the respective item, the pricing strategy for the image item being unconstrained by a cost associated with the item, and the pricing strategy for the non-image item being constrained by the cost and a minimum profitability threshold;
    providing respective pricing data for the first item and the second item; and
    automatically determining the respective adjusted price for the first item and the second item using the respective pricing strategy and the respective pricing data.

16. The computer-implemented method of claim 15, further comprising providing respective non-pricing data related to the first item and the second item.

17. The computer-implemented method of claim 16, wherein the respective adjusted price is determined using the respective pricing strategy, the respective pricing data, and the respective non-pricing data.

18. The computer-implemented method of claim 15, further comprising providing the non-pricing data using an automated searching process.

19. The computer-implemented method of claim 15, wherein the non-pricing data comprises inventory data, initial cost data, product life cycle data, and future demand data.

20. The computer-implemented method of claim 15, further comprising manual approval of the adjusted prices.

21. A system for determining an adjusted price for an item offered for sale, the system comprising:
    at least one data store for storing pricing and non-pricing data about an item;
    a computing device in communication with said data store that is configured to:
        classify the item as an image item when the adjusted price is to be determined without regard to profitability;
        classify the item as a non-image item when the adjusted price is to be determined with regard to profitability;
        determine a pricing strategy for the item based on whether the item is an image item or non-image item, the pricing strategy for the image item being unconstrained by a cost associated with the item, and the pricing strategy for the non-image item being constrained by the cost and a minimum profitability threshold; and
        automatically determine the adjusted price for the item using the pricing strategy, the pricing data and the non-pricing data.

22. The system of claim 21, wherein the pricing strategy for the non-image item causes the adjusted price to be automatically determined with regard to a commission received if the item is sold on behalf of another seller.

23. The system of claim 21, wherein the adjusted price for the item is equal to a lowest competitive price determined from the pricing data.

24. The system of claim 21, wherein the adjusted price for the item is lower than the lowest competitive price determined from the pricing data.

25. The system of claim 21, wherein the computing device is further operative to limit application of the adjusted price to the item based on operational restrictions.

26. A computer-readable medium containing computer executable code for determining an adjusted price for an item offered for sale, wherein the computer executable code when executed by a computing apparatus causes the computing apparatus to:
    provide pricing data for the item;
    provide non-pricing data for the item;
    classifying the item as an image item when the adjusted price is to be determined without regard to profitability;
    classifying the item as a non-image item when the adjusted price is to be determined with regard to profitability; and
    automatically determine the adjusted price for the item using the pricing data and the non-pricing data, the adjusted price being unconstrained relative to a cost of the item when the item is an image item, and the adjusted price being constrained to be greater than the cost when the item is a non-image item.

27. The computer readable medium of claim 26, wherein the computer executable code further causes the computing apparatus to implement the adjusted price.

28. The computer readable medium of claim 26, wherein the computer executable code further causes the computing apparatus to repeat the automatic determination of the adjusted price for the item using at least one of pricing data and non-pricing data for the item that is subsequently provided.

29. A system, comprising
    at least one computing device; and
    a price adjusting engine executable in the at least one computing device, the price adjusting engine comprising:
        logic that obtains internal pricing data associated with an item being offered for sale in an electronic marketplace by a proprietor of the electronic marketplace and by at least one other seller in the electronic marketplace, the proprietor obtaining a respective commission when the item is sold by the at least one other seller;
        logic that obtains external pricing data associated with the item being offered for sale by at least one competitor;
        logic that obtains cost data associated with a cost of the item for the proprietor; and
        logic that generates an adjusted price for the item for the proprietor based at least in part on the internal pricing data, the external pricing data, the cost data, and the respective commission.

30. The system of claim 29, wherein the price adjusting engine further comprises:

logic that classifies the item as an image item when the adjusted price is to be generated without regard to profitability;

logic that classifies the item as a non-image item when the adjusted price is to be generated with regard to profitability;

wherein the adjusted price is constrained to be greater than the cost when the item is classified as a non-image item; and wherein the adjusted price is unconstrained relative to the cost when the item is classified as an image item.

31. The system of claim 29, wherein the adjusted price is based at least in part on predicted future sales of the item by the at least one other seller.

32. The system of claim 31, wherein the adjusted price is selected in order to maintain profitability of the at least one other seller.

33. The system of claim 29, wherein the price adjusting engine further comprises:

logic that obtains inventory data associated with the item and the proprietor;

wherein the adjusted price is based at least in part on the inventory data.

34. The system of claim 29, wherein the adjusted price is based at least in part on at least one import restriction associated with the item.

35. The system of claim 29, wherein the adjusted price is based at least in part on at least one contractual restriction associated with the item.

36. The system of claim 29, wherein the adjusted price is based at least in part on at a life cycle associated with the item.

* * * * *

UNITED STATES PATENT AND TRADEMARK OFFICE
CERTIFICATE OF CORRECTION

PATENT NO. : 7,740,172 B1
APPLICATION NO. : 11/564044
DATED : June 22, 2010
INVENTOR(S) : Zachary T. Hubert et al.

It is certified that error appears in the above-identified patent and that said Letters Patent is hereby corrected as shown below:

Column 18, line 17 (claim 36): after "in part on," delete "at" (second occurrence).

Signed and Sealed this

Third Day of August, 2010

David J. Kappos
*Director of the United States Patent and Trademark Office*